US006923146B2

(12) United States Patent
Kobitz et al.

(10) Patent No.: US 6,923,146 B2
(45) Date of Patent: Aug. 2, 2005

(54) METHOD AND APPARATUS FOR TRAINING AND FOR CONSTRAINING A SUBJECT TO A SPECIFIC AREA

(76) Inventors: Nat Kobitz, 6708 Chippewa Dr., Baltimore, MD (US) 21209; Fred Drasner, 450 W. 33rd St., New York, NY (US) 10001

( * ) Notice: Subject to any disclaimer, the term of this patent is extended or adjusted under 35 U.S.C. 154(b) by 0 days.

(21) Appl. No.: 10/673,452

(22) Filed: Sep. 30, 2003

(65) Prior Publication Data

US 2005/0066912 A1   Mar. 31, 2005

Related U.S. Application Data

(60) Provisional application No. 60/477,039, filed on Jun. 10, 2003.

(51) Int. Cl.⁷ ............................................. A01K 15/02
(52) U.S. Cl. .................................. 119/721; 340/573.4
(58) Field of Search ....................... 119/721, 719, 720, 119/905, 908; 340/573.1, 573.2, 573.3, 573.4

(56) References Cited

U.S. PATENT DOCUMENTS

| | | | | |
|---|---|---|---|---|
| 5,868,100 A | * | 2/1999 | Marsh | 119/421 |
| 5,949,350 A | * | 9/1999 | Girard et al. | 340/825.49 |
| 6,073,589 A | | 6/2000 | Curen et al. | |
| 6,122,960 A | | 9/2000 | Hutchings et al. | |
| 6,232,880 B1 | * | 5/2001 | Anderson et al. | 340/573.3 |
| 6,232,916 B1 | * | 5/2001 | Grillo et al. | 342/357.07 |
| 6,263,836 B1 | | 7/2001 | Hollis | |
| 6,271,757 B1 | * | 8/2001 | Touchton et al. | 340/573.1 |
| 6,487,992 B1 | | 12/2002 | Hollis | |
| 6,561,137 B2 | * | 5/2003 | Oakman | 119/721 |
| 6,581,546 B1 | * | 6/2003 | Dalland et al. | 119/712 |
| 6,700,492 B2 | * | 3/2004 | Touchton et al. | 340/573.1 |
| 6,748,902 B1 | * | 6/2004 | Boesch et al. | 119/719 |

* cited by examiner

Primary Examiner—Yvonne R. Abbott
(74) Attorney, Agent, or Firm—Jones, Tullar & Cooper, PC

(57) ABSTRACT

A method and apparatus to confine and constrain an animal or human subject to a specific area has the capability to change the borders of the restraint area remotely to maximize an area's utility. A collar or support is placed on the subject; the collar carries an electronic module to receive and send signals and to activate a restraining or feedback mechanism. In its simplest form, the collar receives and transmits Global Positioning System (GPS) data to be matched against a preset group of boundary coordinates. The system of the present invention utilizes GPS location technology to define the boundary. When the input matches the boundary coordinates set into the receiver, an impulse is delivered to the subject or wearer. This impulse becomes increasingly severe as the wearer moves farther away from the boundary point. Upon return to the boundary location the impulse ceases and, as long as the wearer stays within the boundaries, no further impulse is imparted. Terrain of the designated area is not a factor in the operation of the system since it can be programmed for use anywhere. The coordinates of the boundaries can either be preset or remotely changed to redefine the permitted areas.

4 Claims, 2 Drawing Sheets

METHOD AND APPARATUS FOR TRAINING AND FOR CONSTRAINING A SUBJECT TO A SPECIFIC AREA

RELATED APPLICATION INFORMATION

This application claims benefit of Provisional application No. 60/477,039, filed on Jun. 10, 2003, entitled "Method and Apparatus for Training and for Constraining a Person or an Animal to a Specific Area", the entire disclosure of which is incorporated herein by reference.

BACKGROUND OF THE INVENTION

1. Field of the Invention

The present invention relates to methods and wireless systems for sensing the location of an ambulatory subject such as a living being (e.g., a person or animal) and for constraining a subject to a specific area.

2. Discussion of the Prior Art

Many pet owners are familiar with devices known as "invisible fences" which can be used in conjunction with training collars that measure proximity to buried wires. Burying the wires is expensive and inconvenient, however, and, once done, limits the training ground to the area within a buried wire perimeter. Actual, physical fence structures are even less convenient.

The invisible fence devices include a training collar with a device that reacts to a pre-installed, fixed electrical induction loop of buried wire, which defines the operating boundaries (e.g., of a training area). The constraint by a fence is physical, while the so-called invisible fence or induction loop activates an impulse within the band worn by the subject. This usually involves a slightly painful alert to the subject, signaling that the subject has crossed a border. Such installations are impractical when the limits are very large and virtually useless when involving water-covered areas or when the borders need to be variable and adjustable or when the training area must be designed extemporaneously.

The prior art also includes many radio proximity devices which can be used to emit an audible signal or provide an electric shock in response to a detected change in received radio signal strength.

These prior art methods require the trainer to choose an area and are not well suited to conducting training exercises in the field, wherever one may be.

The prior art also includes training devices used to monitor behavior of dogs and the like (such as U.S. Pat. Nos. 6,263,836 and 6,487,992 to R. L. Hollis), but they do not address all of the problems identified by the applicants.

There is a need, therefore, for an economical, and convenient, yet effective, method for training dogs, other animals and people which does not require burying wires in an area before training can begin.

OBJECTS AND SUMMARY OF THE INVENTION

Accordingly, it is a primary object of the present invention to overcome the above mentioned difficulties by providing an enhanced wireless training device.

Another object of the present invention is to provide a method and apparatus for constraining an ambulatory subject such as a living being (e.g., a person or animal) which can be readily adapted to varying terrain when in the field.

The aforesaid objects are achieved individually and in combination, and it is not intended that the present invention be construed as requiring both of the objects to be combined.

In accordance with the method and apparatus of the present invention, the need for boundary fencing and wires is no longer necessary to confine and constrain an ambulatory subject such as a living being (e.g., a person or animal) to a specific area. The method and apparatus of the present invention has the inherent ability to change the borders of the restraint area remotely to maximize the area's utility. A wearable support (such as a collar or band) is placed on the subject; the band carries an electronic module to receive and send signals and to activate a restraining mechanism. In its simplest form, the band receives and transmits Global Positioning System (GPS) data to be matched against a preset group of boundary coordinates.

The method and apparatus of the present invention preferably utilizes GPS location technology to define the boundary. When the input matches the boundary coordinates set into the receiver, an impulse is delivered to the subject or wearer. This impulse becomes increasingly severe as the wearer moves farther way from the boundary point. Upon return to the boundary location the impulse ceases and, as long as the wearer stays within the boundaries, no further impulse is imparted. Another unique feature is that the terrain of the designated area is not a limiting factor in the operation of the system of the present invention since the system can be programmed for use anywhere. The coordinates of the boundaries can either be preset or remotely changed to redefine the permitted areas.

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

DESCRIPTION OF THE PREFERRED EMBODIMENT

Figure 1:
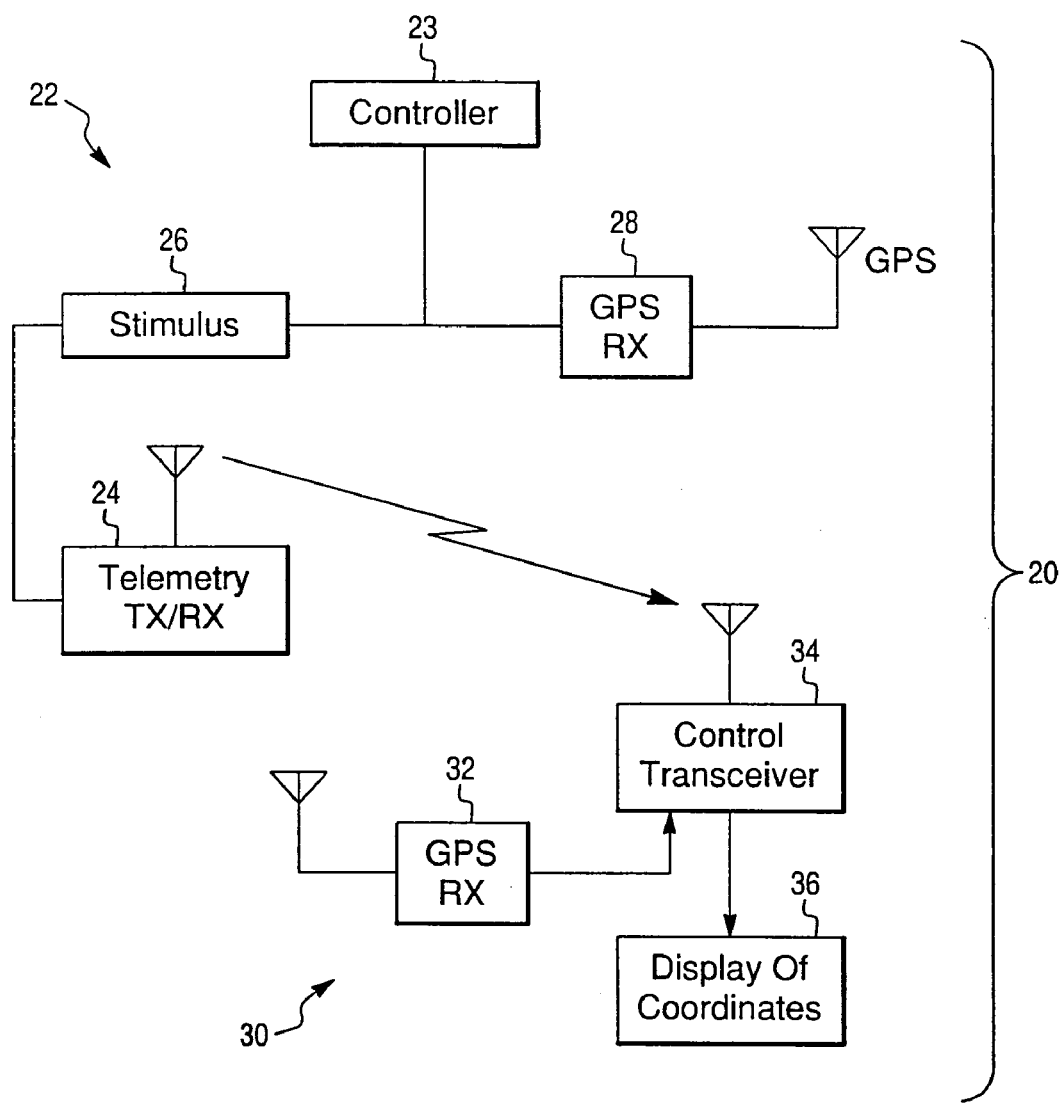
FIG. 1 is a schematic diagram of the interconnected and interoperable elements of the system or apparatus of the present invention, for use in practicing the method of the present invention.
Figure 2:
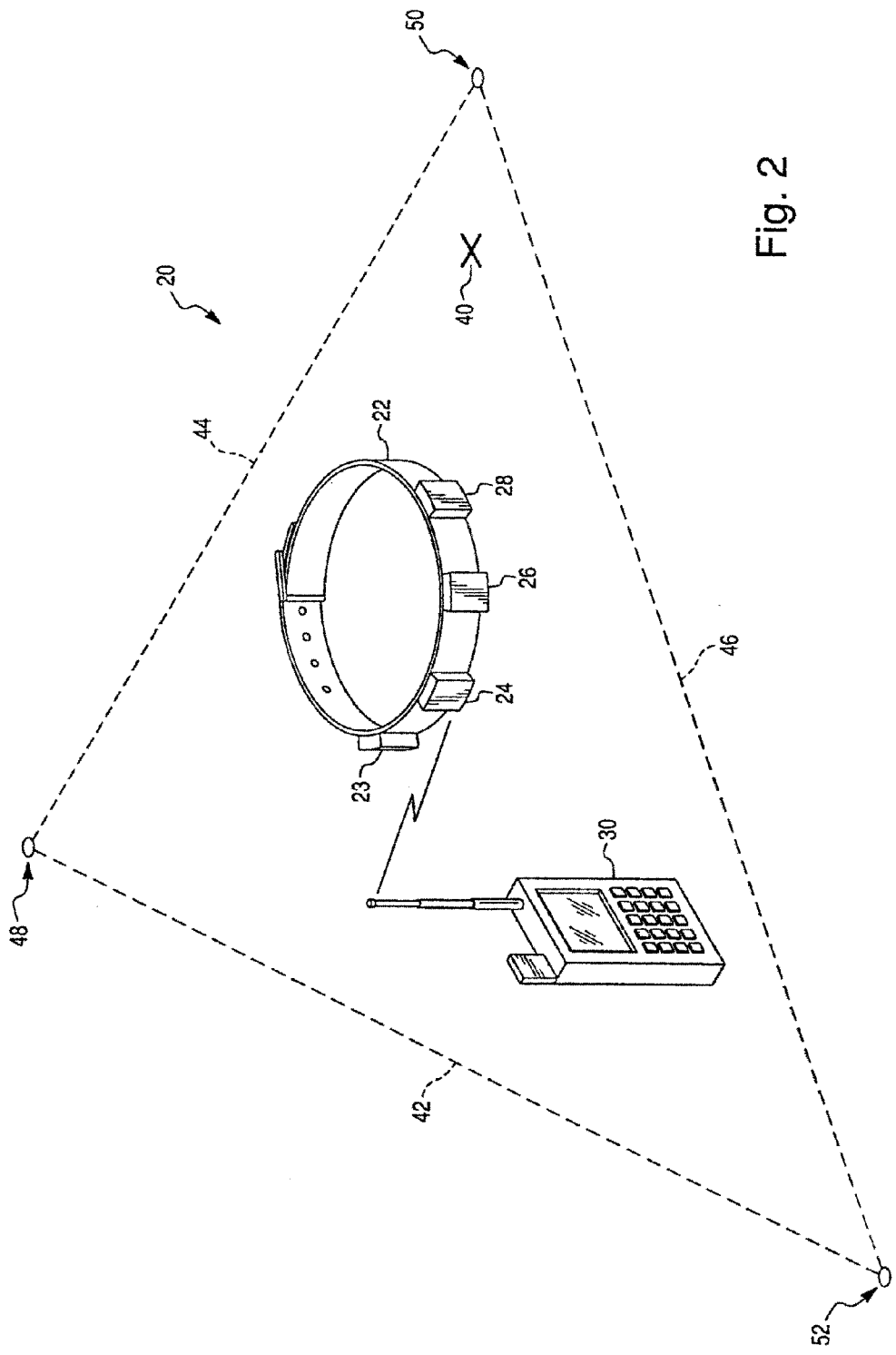
FIG. 2 is a geographic diagram of the interoperable elements of the system of the present invention, for use in practicing the method of the present invention.

As best seen in FIGS. 1 and 2, system 20 preferably includes at least one wearable support or collar 22 and at least one master controller 30. Collar 22 preferably carries a CPU or controller 23 which is connected to and responsive to a telemetry transmitter/receiver 24, an electrical stimulus generating circuit 26 and a Global Positioning System (GPS) receiver 28, all integrated into a substantially waterproof releasably attachable structure.

Master controller 30 is preferably housed in an enclosure adapted to be easily carried by a user in the field and includes a CPU or controller which is connected to and responsive to a keyboard or other input device, a telemetry transmitter/receiver 34, a Global Positioning System (GPS) receiver 32 and a display 36.

In accordance with the method and apparatus of the present invention, the need for boundary fencing and wires is no longer necessary to confine and constrain an animal or human to a specific area. System 20 has the inherent ability to change the borders of the selected restraint area 40 remotely to maximize the restraint area's utility. Collar 22 is placed on the subject and carries an electronic module or transceiver 24 to receive and send telemetry signals and activate a restraining mechanism such as electrical stimulus generator 26. In an exemplary embodiment, collar 22 carries a GPS receiver 28 and receives and transmits Global Positioning System (GPS) telemetry data to be matched against a preset group of coordinates.

As noted above, prior art training or restraint methods include fencing and devices that react to a pre-installed or buried fixed electrical induction loop that defines the operating boundaries. The constraint by a fence is physical, while the so-called induction loop activates an impulse within the band worn by the subject. This usually involves a slightly painful alert to the subject, signaling that the subject has crossed a border. Such installations are impractical when the limits are very large and virtually useless when involving water-covered areas or when the borders need to be variable and adjustable or when the training area must be designed extemporaneously.

The method and apparatus of the present invention preferably utilizes GPS location technology to define boundaries such as the boundary lines 42, 44, 46 that together define selected restraint area 40. When the collar's GPS input matches the boundary coordinates set into the controller or receiver, a feedback signal, preferably in the form of an electrical stimulus or impulse, is delivered to the subject or wearer. This impulse becomes increasingly severe as the wearer moves farther way from the boundary point. Upon return to the boundary location or selected restraint area 40, the feedback signal or impulse ceases and, as long as the wearer stays within the boundaries, no further impulse is imparted.

Another unique feature is that the terrain of the selected restraint area 40 is not a limiting factor in the operation of system 22. The coordinates of the selected restraint area boundaries 42, 44, 46 can either be pre-set or remotely changed using master controller 30 to redefine the permitted areas.

Additionally, a signal can be sent to collar or band 22 to control the wearer's activities in response to specific commands. In an exemplary embodiment, the device is used for animal training and specific signals are annunciated or communicated through the collar and used convey or identify commands such as "stay", "come", "sit", "retrieve" and "flush".

In addition to the restraint and command functions, the exact location of the subject is identified and transmitted to the system operator or user carrying master controller 30 for passive location of the subject. Master controller 30 is preferably portable and includes a second GPS receiver 32, a control transceiver 34 and a Display 36. Master controller control transceiver 34 is configured to receive a signal transmitted from collar transceiver 24 and display both the position of the collar 22 and the master controller 30 on the master controller display 36.

When several subjects are being controlled simultaneously, different communication channels or frequencies can be employed. The preferred embodiment for system 20 is for training and control of hunting dogs. Notwithstanding this preference, general animal or human control is readily accomplished using system 20.

The method and apparatus of the present invention provides flexibility and adaptability not available with prior art devices. The dual ability of setting and changing boundary limits without fixed or active restraints and the facility of sending commands to the subject results in a training and control device of unparalleled effectiveness.

Turning now to an alternative embodiment for use in training, e.g., in an open, unbounded field: First, the user enters Coordinates bounding a selected restraint area 40, and then the subject is permitted to roam within that selected restraint area 40 without receiving a shock (or other adverse feedback signal used to train the subject to stay within the selected restraint area). It is noted that a number of manufacturers, such as Garmin™ now offer a GPS receiver with position reporting accuracy of approximately twelve feet.

Other methods are possible, for example, using Collar 22 only, a "Dumb input" method permits training when there is no access to a Master Controller 30. In the exemplary method, a user walks the perimeter (e.g., along boundaries 42, 44 and 46) while the subject or the user carries the collar from one "way-point" to another to put the GPS location way-points into collar, e.g. while pressing a button on the collar.

In an alternative method, a user stands at 3 or more "corners" (e.g. 48, 50 and 52) and an area within those three points is defined as the training area 40.

In another alternative method, a user presses an actuating button once to define, within collar 22, the center of selected circular training area.

Collar 22 is optionally configurable with an electrical connection or other circuitry permitting data entry from a user's computer or personal digital assistant (e.g., a PALM™ PDA or a portable P.C.) programmed to create and download a selected area's boundaries to the CPU of collar 22.

In another embodiment, continually adjustable boundary inputs can be provided to collar 22; a Dog's coordinates are entered via radio link from the owner/trainer's master controller 30. The master controller 30 includes GPS receiver 32 and continually or periodically updates a moving bounded area by transmitting the location of the owner/trainer's master controller 30 to collar 22, so the dog can be trained to stay within a bounded area including the position of the owner/trainer's master controller 30, even as the owner/trainer walks or moves about in the field.

Each CPU or controller described above (e.g., the CPU in Master controller 30 and the CPU 23 in collar 22) includes a memory for storing data and programs as well as the customary input-output circuitry used to transfer data into and out of the controller, and so Master Controller 22 is preferably enclosed in a housing including a keyboard or other data input device adapted to be used in the field, in accordance with the exemplary method described above.

Each of the receivers and transceivers includes the customary antennae required to transmit or receive signals, as is well known in the art. Optionally, the antennae included in collar or band 22 are flexible planar antenna structures laminated within flexible substrates, as are well known in the art.

"Collar", as referred to herein, is understood to be a wearable support that is adapted to be fastened to and carried by a subject; preferably the collar is releasably fastened to the subject. For purposes of construing the appended claims, any wearable support (e.g., a harness, sling, strap or garment) is an equivalent support for the components carried in the exemplary embodiment illustrated above.

"Restraint Area", as referred to herein is understood to be an area selected by a system user in much the same way a buried-wire system user selects the area before burying a wire; it is an area on a selected side of a boundary line, which may be an enclosed area, but is not necessarily an enclosed area.

"GPS" as referred to herein means the Global Positioning System, but as those of skill in the art will appreciate, other dedicated, electronic navigational or positioning aids can be equivalent, for purposes of practicing the method of the present invention.

It will be appreciated by those of skill in the art that the system and method of the present invention makes a versatile location or training tool available.

The method for training a subject when in the field, preferably includes the following method steps: actuating a portable master controller 30 with a first telemetry transmitter/receiver 34, a display 36 and a first Global Positioning System receiver 32, all: connected to and responsive to a first CPU having a memory; actuating a collar 22 carrying a second telemetry transmitter/receiver 24, a second Global Positioning System receiver 28 and an electrical feedback stimulus generator 26, each connected to and responsive to a second CPU 23 having a memory; affixing collar 22 to a subject (e.g., an animal such as a hunting dog in the field); setting a first boundary defining a first restraint area (e.g., 40) within which the subject is permitted to travel and storing the first boundary in the collar CPU memory; detecting a first collar location (e.g., as shown in FIG. 2) using the collar Global Positioning System receiver, and comparing the collar location to the first boundary; and then actuating the collar feedback stimulus 26 if the collar's location is outside the first boundary.

The user may then move to a new and different area and define a new restraint area; continuing by setting a second boundary defining a second restraint area within which the subject is permitted to travel and storing the second boundary in the collar's CPU memory; the user next detects a second collar location using the collar Global Positioning System receiver 28, and compares the collar location to the first boundary, actuating the collar feedback stimulus 26 if the second collar location is outside the second boundary.

The user may then continue by carrying the portable master controller 30 from a first master controller location within the first restraint area to a second master controller location within the second restraint area, and then determining the GPS coordinates of the second master controller location within the second restraint area, and then, optionally, defining a third restraint area which can be different than the second restraint area. GPS coordinates describing the third restraint area are transmitted from master controller 30 to collar 22, and the third restraint area information is stored in the collar CPU memory.

The user may then continue by: setting a third boundary defined by a third restraint area within which the subject is permitted to travel and storing the third boundary in the collar CPU memory; detecting a third collar location using the collar Global Positioning System receiver, and comparing the collar location to the third boundary and actuating the collar feedback stimulus generator if the third collar location is outside the third boundary.

The collar feedback stimulus generator 26 may include one or more electric shock circuits.

As noted above, boundary setting can be done using only collar 22, by actuating a control input (e.g., a switch or contact) on collar 22; sensing the GPS coordinates of collar 22; calculating an enclosed circular area of a selected size centered on the then current GPS coordinates of the collar; setting the first restraint area to be substantially co-extensive with the enclosed circular area, and storing the first boundary in the collar CPU memory.

Alternatively, another "collar only" method for setting a first boundary includes: actuating a control input on collar 22; sensing the GPS coordinates of the collar at a first way point (48); sensing the GPS coordinates of the collar at a second way point (50); sensing the GPS coordinates of the collar at a third way point (52); calculating an enclosed polygonal area (40) from the GPS coordinates of the first, second and third way points; setting the first restraint area to be substantially co-extensive with the enclosed polygonal area 40; and storing the first boundary in the collar CPU memory.

Another "collar only" method for setting a first boundary includes: actuating a control input (e.g., a switch or contact) on collar 22; sensing the GPS coordinates of the collar while carrying the collar along a desired boundary line or arbitrary shape (e.g., following an irregular desired contour which does not necessarily define an enclosed area); setting the first boundary to be coextensive with the desired boundary line; and storing the first boundary in the collar CPU memory.

Yet another "collar only" method for setting a first boundary includes: actuating a control input (e.g., a switch or contact) on collar 22; sensing the GPS coordinates of the collar while carrying the collar along the perimeter of a desired restraint area; setting the first boundary to be substantially coextensive with the perimeter of the desired restraint area; and storing the first boundary in the collar CPU memory.

Another method for training a subject (e.g., an animal such as a hunting dog) when in the field includes: providing a portable master controller 30 with a display, a first telemetry transmitter/receiver, a display and a first Global Positioning System receiver, all connected to and responsive to a first CPU having a memory; providing a collar 22 carrying a second telemetry transmitter/receiver, a second Global Positioning System receiver and an electrical feedback stimulus generator, each connected to and responsive to a second CPU having a memory; affixing collar 22 to a subject; carrying the portable master controller to a first master controller location; determining the GPS coordinates of the first master controller location; defining a first permitted or restraint area (e.g., 40) and storing the GPS coordinates corresponding to the first restraint area in the master controller memory; transmitting the GPS coordinates corresponding to the first restraint area from the master controller to the collar; and storing the GPS coordinates corresponding to the first restraint area in the collar CPU memory.

Optionally, the method also includes the method steps of: setting a first boundary defined by the first restraint area within which the subject is permitted to travel and storing the first boundary in the collar CPU memory; detecting a first collar location using the collar Global Positioning System receiver, and comparing the first collar location to the first boundary; and displaying a representation of the first collar location and the first boundary on the portable master controller display; or actuating the collar feedback stimulus if the first collar location is outside the first boundary; and then displaying a representation that the first collar location is outside the first boundary on the portable master controller display.

The method may also include the method step of transmitting a selected specific command signal to the collar to convey a first command selected from the group including: stay, come, sit, retrieve and flush.

System 20 preferably includes: a portable master controller 30 including housing that encloses and supports a first telemetry transmitter/receiver, a display, and a first Global Positioning System receiver, all connected to and responsive to a first CPU having a memory; a wearable support or collar 22 carrying a second telemetry transmitter/receiver tunable to communicate with the first transmitter/receiver, a second Global Positioning System receiver and an electrical feedback stimulus generator, each connected to and responsive to a second CPU having a memory; where the master controller CPU is programmed to receive GPS location coordinates from the first Global Positioning System receiver, and to receive GPS location coordinates from the second Global Positioning System receiver via a channel of communication maintained between the second telemetry transmitter/receiver and the wearable first transmitter/receiver.

Optionally, the wearable support electrical feedback stimulus generator 26 includes a circuit adapted to give a feedback signal in the form of an electric shock or an annunciator adapted to communicate in spoken commands, in response to receiving selected command signals from master controller 30.

As noted above, the system 20 can include more than one collar or a second wearable support carrying a third telemetry transmitter/receiver tunable to communicate with the first transmitter/receiver, a third Global Positioning System receiver and an electrical feedback stimulus generator, each connected to and responsive to a third CPU having a memory, and so the master controller's CPU is programmed to receive GPS location coordinates from the third Global Positioning System receiver via a channel of communication maintained between the third telemetry transmitter/receiver and the wearable first transmitter/receiver.

The master controller display 36 is programmed to display a representation of the location of collar 22 as well as the location of the user carrying master controller 30, when in the field.

Having described preferred embodiments of a new and improved method, it is believed that other modifications, variations and changes will be suggested to those skilled in the art in view of the teachings set forth herein. It is therefore to be understood that all such variations, modifications and changes are believed to fall within the scope of the present invention, as set forth in the claims.

What is claimed is:

1. A method for training an animal subject when in the field, comprising the method steps of:
   (a) providing a portable master controller with a display, a first telemetry transmitter/receiver, a display and a first Global Positioning System receiver, all connected to and responsive to a first CPU having a memory;
   (b) providing a collar carrying a second telemetry transmitter/receiver, a second Global Positioning System receiver and an electrical feedback stimulus generator, each connected to and responsive to a second CPU having a memory;
   (c) affixing said collar to a subject animal;
   (d) carrying said portable master controller to a first master controller location;
   (e) determining the GPS coordinates of said first master controller location;
   (f) defining a first permitted area and storing the GPS coordinates corresponding to said first restraint area in said master controller memory;
   (g) transmitting said GPS coordinates corresponding to said first restraint area from said master controller to said collar;
   (h) storing said GPS coordinates corresponding to said first restraint area in said collar CPU memory;
   (i) setting a first boundary defined by said first restraint area within which the animal subject is permitted to travel and storing said first boundary in said collar CPU memory;
   (j) detecting a first collar location using the collar Global Positioning System receiver, and comparing the first collar location to said first boundary, and
   (k) displaying a representation of said first collar location and said first boundary on said portable master controller display.

2. A method for training an animal subject when in the field, comprising the method steps of:
   (a) providing a portable master controller with a display, a first telemetry transmitter/receiver, a display and a first Global Positioning System receiver, all connected to and responsive to a first CPU having a memory;
   (b) providing a collar carrying a second telemetry transmitter/receiver, a second Global Positioning System receiver and an electrical feedback stimulus generator, each connected to and responsive to a second CPU having a memory;
   (c) affixing said collar to a subject animal;
   (d) carrying said portable master controller to a first master controller location;
   (e) determining the GPS coordinates of said first master controller location;
   (f) defining a first permitted area and storing the GPS coordinates corresponding to said first restraint area in said master controller memory;
   (g) transmitting said GPS coordinates corresponding to said first restraint area from said master controller to said collar;
   (h) storing said GPS coordinates corresponding to said first restraint area in said collar CPU memory;
   (i) setting a first boundary defined by said first restraint area within which the animal subject is permitted to travel and storing said first boundary in said collar CPU memory;
   (j) detecting a first collar location using the collar Global Positioning System receiver, and comparing the first collar location to said first boundary; and
   (k) actuating the collar feedback stimulus if said first collar location is outside said first boundary; and
   (l) displaying a representation that said first collar location is outside said first boundary on said portable master controller display.

3. A portable system for use in locating or training a mobile subject, comprising:
   (a) a portable master controller including housing that encloses and supports a first telemetry transmitter/receiver, a display, and a first Global Positioning System receiver, all connected to and responsive to a first CPU having a memory;
   (b) a wearable support carrying a second telemetry transmitter/receiver tunable to communicate with said first transmitter/receiver, a second Global Positioning System receiver and an electrical feedback stimulus generator, each connected to and responsive to a second CPU having a memory;

(c) wherein said master controller CPU is programmed to receive GPS location coordinates from said first Global Positioning System receiver, and to receive GPS location coordinates from said second Global Positioning System receiver via a channel of communication maintained between said second telemetry transmitter/receiver and said wearable first transmitter/receiver; and (d) wherein said master controller display is programmed to display a representation of the location of said wearable support.

4. The portable system of claim 3, wherein said master controller display is programmed to display a representation of the location of said master controller.

* * * * *